United States Patent
Doswald et al.

[11] Patent Number: 5,386,015
[45] Date of Patent: Jan. 31, 1995

[54] MONOAZO AND DISAZO COMPOUNDS HAVING 5-CYANO-2,4-AND 4,6-DICHLOROPYRIMIDYL GROUPS

[75] Inventors: Paul Doswald, Münchenstein; Werner Koch, Oberwil, both of Switzerland

[73] Assignee: Sandoz Ltd., Basel, Switzerland

[21] Appl. No.: 90,227

[22] Filed: Jul. 9, 1993

Related U.S. Application Data

[63] Continuation of Ser. No. 685,095, Apr. 12, 1991, abandoned, which is a continuation of Ser. No. 565,586, Aug. 10, 1990, abandoned, which is a continuation of Ser. No. 424,623, Oct. 20, 1989, abandoned.

[30] Foreign Application Priority Data

| Oct. 20, 1988 | [DE] | Germany | 3835659 |
| Oct. 20, 1988 | [DE] | Germany | 3835724 |
| Oct. 20, 1988 | [DE] | Germany | 3835725 |
| Jan. 4, 1989 | [DE] | Germany | 3900098 |
| Mar. 21, 1989 | [DE] | Germany | 3909235 |

[51] Int. Cl.$^6$ ............ C09B 62/24; D06P 1/382
[52] U.S. Cl. ............ 534/637; 534/573; 534/606; 534/625; 534/627; 534/634; 534/635; 534/638
[58] Field of Search ............ 534/573 M, 606, 625, 534/627, 634, 635, 637, 638

[56] References Cited

U.S. PATENT DOCUMENTS

| 3,120,507 | 2/1964 | Andrew et al. | 534/625 X |
| 3,256,268 | 6/1966 | Dussy | 534/627 X |
| 3,288,777 | 11/1966 | Benz et al. | 534/627 X |
| 3,342,798 | 9/1967 | Dussy et al. | 534/627 |
| 3,377,335 | 4/1968 | Durig et al. | 534/625 |
| 3,502,642 | 3/1970 | Dussy | 534/627 |
| 3,725,383 | 4/1973 | Austin et al. | 534/635 X |
| 3,926,944 | 12/1975 | Berrie et al. | 534/634 |
| 3,936,436 | 2/1976 | Berrie et al. | 534/635 |
| 3,994,906 | 11/1976 | Hegar | 546/291 |
| 4,017,477 | 4/1977 | Hegar et al. | 534/625 |
| 4,039,523 | 8/1977 | Hegar | 534/635 |
| 4,067,864 | 1/1978 | Oesterlein et al. | 534/635 |
| 4,092,308 | 3/1978 | Hegar | 534/634 |
| 4,283,331 | 8/1981 | Seitz et al. | 534/638 |
| 4,338,092 | 7/1982 | Schneider | 8/549 |
| 4,659,806 | 4/1987 | Jager | 534/635 X |

FOREIGN PATENT DOCUMENTS

| 225730 | 8/1987 | European Pat. Off. . |
| 2238795 | 2/1973 | Germany | 534/634 |
| 2009213 | 6/1979 | United Kingdom . |
| 2023158 | 12/1979 | United Kingdom . |
| 1566804 | 5/1980 | United Kingdom . |
| 2063284 | 6/1981 | United Kingdom . |

OTHER PUBLICATIONS

Beech, "Fibre-Reactive Dyes", Logos Press Limited, London, Great Britain, p. 177 (1970).

Kulkarni et al., "Textile Dyeing Operations", Noyes Publications, New Jersey, USA, pp. 100-102 (1986).

*Primary Examiner*—Robert W. Ramsuer
*Assistant Examiner*—Fiona T. Powers
*Attorney, Agent, or Firm*—Robert S. Honor; Melvyn M. Kassenoff

[57] ABSTRACT

Compounds of the formula

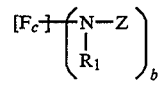

and salts thereof, and mixtures of such compounds and salts, wherein $F_c$ is

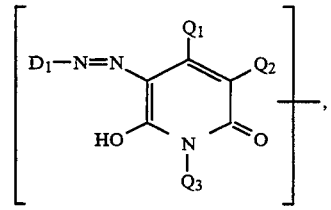

(Abstract continued on next page.)

-continued

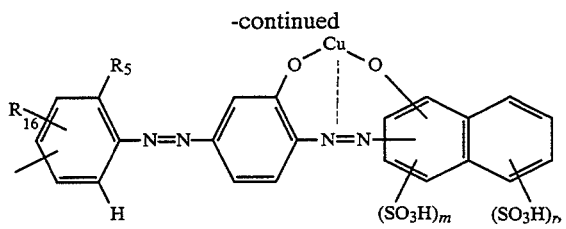

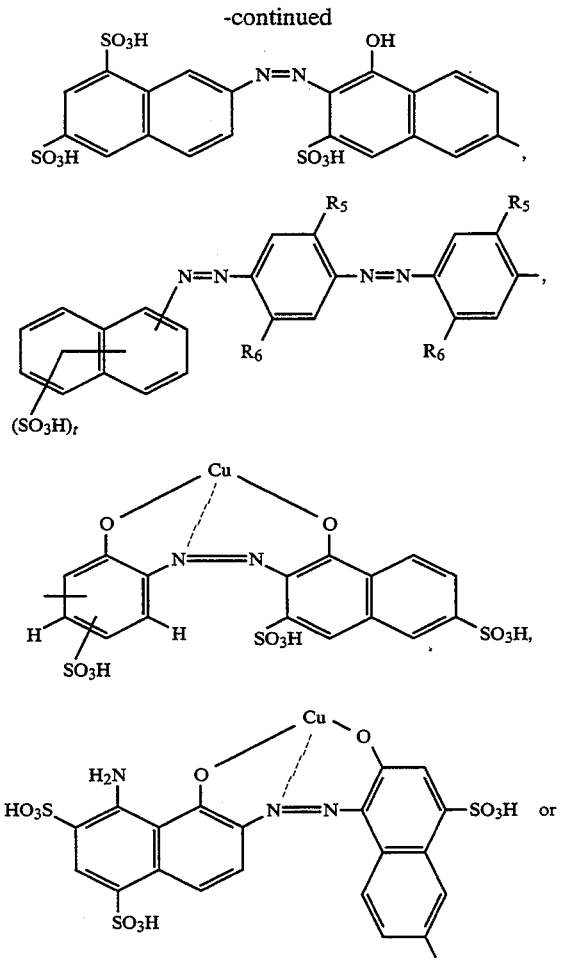

wherein
- $D_1$ is an unsubstituted or substituted phenyl or naphthyl diazo component radical,
- each of $Q_1$, $Q_2$ and $Q_3$ is independently hydrogen or a substituent,
- each $R_5$ is independently hydrogen, $C_{1-4}$alkyl or $C_{1-4}$alkoxy,
- each $R_6$ is independently hydrogen, halo, $C_{1-4}$alkyl, $C_{1-4}$alkoxy, ($C_{1-4}$alkyl)carbonylamino or —NH—CO—NH$_2$,
- $R_{16}$ is hydrogen or —SO$_3$H,
- r is 1 or 2, and
- t is 2 or 3, and
- b is 1 or 2, wherein
- each $R_1$ is independently hydrogen or $C_{1-4}$alkyl,
- each $R_7$ is independently hydroxy, $C_{1-4}$alkoxy or —NH$_2$,
- each Z is independently

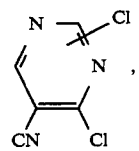

and
- each m is independently 0 or 1.

20 Claims, No Drawings

MONOAZO AND DISAZO COMPOUNDS HAVING 5-CYANO-2,4-AND 4,6-DICHLOROPYRIMIDYL GROUPS

This is a continuation of application Ser. No. 07/685,095, filed Apr. 12, 1991 and now abandoned, which is a continuation of application Ser. No. 07/565,586, filed Aug. 10, 1990 and now abandoned, which in turn is a continuation of application Ser. No. 07/424,623, filed Oct. 20, 1989 and now abandoned.

This invention relates to fibre-reactive monoazo disazo compounds which are metal-free or in metal complex form, and a process for their preparation. These compounds are suitable for use as fibre-reactive dyestuffs in conventional dyeing and printing processes.

More particularly, this invention provides compounds of formula I $$[F_c]\!-\!\!\left(\!\!\begin{array}{c}N-Z\\|\\R_1\end{array}\!\!\right)_b \qquad \text{I}$$

and salts thereof, in which
b is 1 or 2,
each $R_1$, independently, is hydrogen or $C_{1-4}$alkyl,
each Z is

[structure: 5-cyano-dichloropyrimidyl group], and $[F_c]\!-\!(NR_1)_b$ is a chromophoric radical of one of the formulae (1)

[structure showing $D_1-N=N$ group with $Q_1$, $Q_2$, HO, N-$Q_3$, =O, and $-(NR_1)_b$]

in which
b is 1 or 2 and the —$NR_1$— group(s) is (are) located in $D_1$, $Q_2$ and/or $Q_3$,
$D_1$ is one of the groups (a) to (h), (a) [phenyl with $(SO_3H)_p$, $R_2$, $R_3$, *]

(b) [phenyl with $(SO_3H)_p$, $R_4O-A_1-O$, *]

(c) [naphthyl with $(SO_3H)_q$, *]

(d) [phenyl with $(SO_3H)_r$, *, $-(CH_2)_n$]

(e) [phenyl with $R_5$, $R_6$, *, $-(CH_2)_n$]

(f) [phenyl-CON($R_1$)-phenyl with $(SO_3H)_r$, *]

(g) [phenyl-N($R_1$)CO-phenyl with $(SO_3H)_r$, *]

(h) [$-(CH_2)_n$-naphthyl with $(SO_3H)_q$, *]

in which each bond marked with an asterisk is attached to the azo group, and each other free bond is attached to —$NR_1$—(Z),
each $R_1$, independently, is as defined above,
$R_2$ is hydrogen, halogen, $C_{1-4}$alkyl, $C_{1-4}$alkoxy, acetylamino, benzoylamino or —$COR_7$,
$R_3$ is hydrogen, halogen, $C_{1-4}$alkyl, $C_{1-4}$alkoxy or —$COR_7$,
$A_1$ is —$C_{2-3}$alkylene—,
$R_4$ is hydrogen, —$SO_3H$, $C_{1-4}$alkyl or $C_{2-4}$hydroxyalkyl,
$R_5$ is hydrogen, $C_{1-4}$alkyl or $C_{1-4}$alkoxy,
$R_6$ is hydrogen, halogen, $C_{1-4}$alkyl, $C_{1-4}$alkoxy, —NHCOC$_{1-4}$alkyl or —NHCONH$_2$,
$R_7$ is —OH, —OC$_{1-4}$alkyl or —NH$_2$,
n is 0, 1, 2, 3 or 4,
p is 0, 1 or 2,
q is 1, 2 or 3, and
r is 1 or 2;
$Q_1$ is hydrogen, $C_{1-4}$alkyl, $C_{5-6}$cycloalkyl, phenyl or phenyl($C_{1-4}$alkyl) in which each phenyl ring is unsubstituted or substituted by 1 to 3 substituents selected from $C_{1-4}$alkyl, $C_{1-4}$alkoxy, halogen, —COOH and —SO$_3$H; —COR$_7$, —C$_{1-4}$alkyl-SO$_3$H, —C$_{1-4}$alkyl-OSO$_3$H or —C$_{1-4}$alkyl-COR$_7$, Q$_2$ is hydrogen, —CN, —NO$_2$, —SO$_3$H, —COR$_7$, unsubstituted C$_{1-4}$alkyl, C$_{1-4}$alkyl monosubstituted by —OH, halogen, —CN, C$_{1-4}$alkoxy,

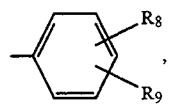

—SO$_3$H, —OSO$_3$H, —COR$_7$ or —NH$_2$; —SO$_2$NH$_2$,

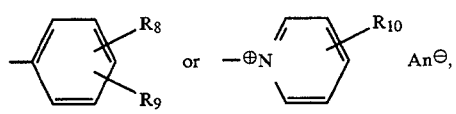

in which

R$_8$ is hydrogen, halogen, C$_{1-4}$alkyl, C$_{1-4}$alkoxy, —COOH or —SO$_3$H,

R$_9$ is hydrogen, —SO$_3$H or a direct bond to —NR$_1$—Z),

R$_{10}$ is hydrogen, C$_{1-4}$alkyl or C$_{2-4}$hydroxyalkyl, and An$^\ominus$ is a non-chromophoric anion; and Q$_3$ is hydrogen, a bridging group —Y$_1$— as defined below which is connected with —NR$_1$—(Z); C$_{1-6}$alkyl, C$_{2-4}$alkenyl, C$_{2-4}$alkynyl, C$_{5-6}$cycloalkyl, phenyl or phenyl (1-4alkyl) in which each phenyl ring is unsubstituted or substituted by 1 to 3 substituents selected from halogen, C$_{1-4}$alkyl, C$_{1-4}$alkoxy, —SO$_3$H, —COOH and —NH$_2$, and/or bears a direct bond to —NR$_1$—(Z); or —C$_{1-6}$alkylene-Y$_2$, in which Y$_1$ is —C$_{2-6}$alkylene—, monohydroxy-substituted —C$_{3-6}$alkylene—, —C$_{2-6}$alkylene— which is interrupted by —O— or —NR$_1$—;

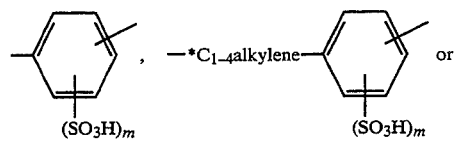

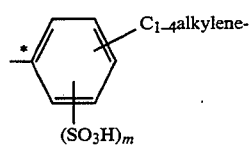

in which

R$_1$, independently, is as defined above, m is 0 or 1, and each asterisk identifies the carbon atom attached to the nitrogen of the pyridone ring, or —Y$_1$—NR$_1$—(Z) forms

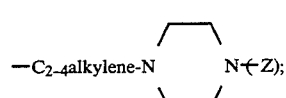

and

Y$_2$ is —COOH, —COOH, —COOC$_{1-4}$alkyl, —SO$_3$H, —OSO$_3$H, —OH, —CN, C$_{1-4}$alkoxy, —NH$_2$ or a protonatable aliphatic, cycloaliphatic, aromatic or heterocyclic amino group or a quaternary ammonium group;

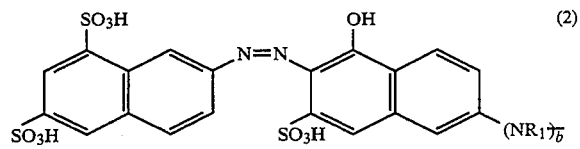

in which
b is 1 and the —NR$_1$—group is attached to Z;

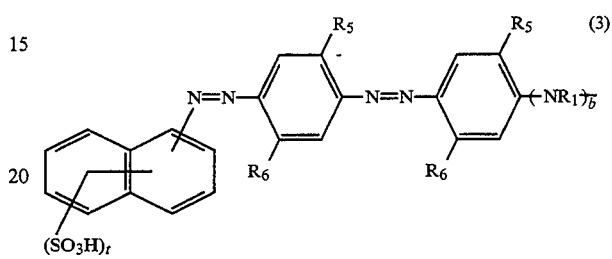

in which
b is 1 and the —NR$_1$—group is attached to Z,
t is 2 or 3, and
each R$_5$ and each R$_6$, independently, are as defined above;

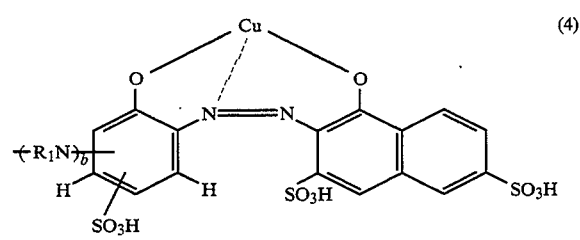

in which
b is 1 and the —NR$_1$—group is attached to Z;

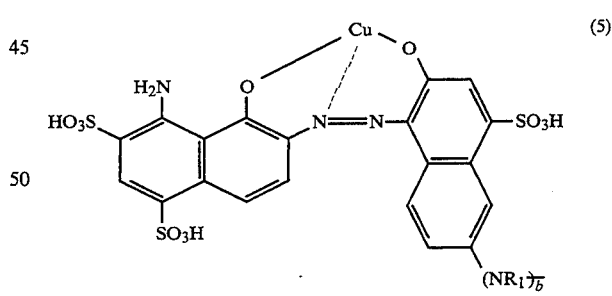

in which
b is 1 and the —NR$_1$—group is attached to Z;

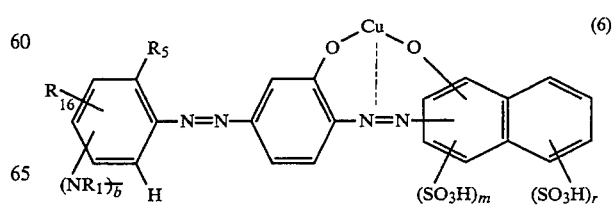

in which b is 1 and the —NR$_1$—group is attached to Z,
R$_5$ is as defined above,
R$_{16}$ is hydrogen or —SO$_3$H,
m is 0 or 1,
r is 1 or 2, and
m+r is 2 or 3, and
in which the —O— and —N=N— radicals are ortho to each other and are in the 1,2- or 2,1-positions, respectively, of the naphthalene ring.

In the specification, any alkyl, alkenyl, alkynyl or alkylene group present is linear or branched unless indicated otherwise. In any hydroxy-substituted alkyl or alkylene group which is attached to a nitrogen atom, the hydroxy group is preferably bound to a carbon atom which is not directly attached to the nitrogen atom. In any alkylene chain interrupted by —O— or —NR$_1$— which is attached to a nitrogen atom, preferably the —O— or —NR$_1$— is bound to a carbon atom which is not directly attached to the nitrogen atom.

Any halogen is preferably fluorine, chlorine or bromine; more preferably, it is chlorine or bromine, and especially chlorine.

Preferably, the chromophoric radical of formula (1) contains at least one sulphonic acid group.

b is preferably 1.

Each R$_1$ is preferably R$_{1a}$, where each R$_{1a}$ independently is hydrogen, methyl or ethyl; more preferably it is R$_{1b}$, where each R$_{1b}$, independently, is hydrogen or methyl. Most preferably R$_1$ is hydrogen.

Preferably, R$_7$ is R$_{7a}$, where R$_{7a}$ is —OH, methoxy, ethoxy or —NH$_2$; more preferably, it is R$_{7b}$, where R$_{7b}$ is —OH or —NH$_2$.

R$_2$ is preferably R$_{2a}$, where R$_{2a}$ is hydrogen, chlorine, methyl, ethyl, methoxy, ethoxy, acetylamino, benzoylamino or —COR$_{7a}$. More preferably R$_2$ is R$_{2b}$, where R$_{2b}$ is hydrogen, chlorine, methyl, methoxy, acetylamino, benzoylamino or —COR$_{7b}$. Even more preferably R$_2$ is R$_{2c}$, where R$_{2c}$ is hydrogen, chlorine, methyl, methoxy, acetylamino or —COOH. Most preferably R$_2$ is R$_{2d}$, where R$_{2d}$ is hydrogen, chlorine, methyl or methoxy.

R$_3$ is preferably R$_{3a}$, where R$_{2a}$ is hydrogen, chlorine, methyl or methoxy; more preferably R$_3$ is R$_{3b}$, where R$_{3b}$ is hydrogen, chlorine or methyl. Most preferably R$_3$ is hydrogen.

A$_1$ is preferably ethylene.

R$_4$ is preferably R$_{4a}$, where R$_{4a}$ is hydrogen, sulpho, methyl, ethyl or 2-hydroxyethyl. More preferably R$_4$ is R$_{4b}$, where R$_{4b}$ is hydrogen, sulpho or 2-hydroxyethyl. Most preferably R$_4$ is R$_{4c}$, where R$_{4c}$ is hydrogen or sulpho.

Each R$_5$ is preferably R$_{5a}$, where each R$_{5a}$, independently, is hydrogen, methyl or methoxy. More preferably it is R$_{5b}$, where each R$_{5b}$, independently, is hydrogen or methoxy. Most preferably each R$_5$ is hydrogen.

Each R$_6$ is preferably R$_{6a}$, where each R$_{6a}$, independently, is hydrogen, chlorine, methyl, methoxy, —NHCOCH$_3$ or —NHCONH$_2$. More preferably R$_6$ is R$_{6b}$, where each R$_{6b}$, independently, is hydrogen, methyl, —NHCOCH$_3$ or —NHCONH$_2$.

In a group of formula (d) or (e), n is preferably 0 or 1, especially 0.

The group (a) is preferably (a$_1$) corresponding to the formula

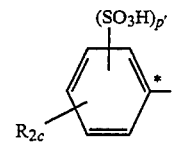

in which p' is 1 or 2.

More preferably, it is (a$_2$) corresponding to the formula

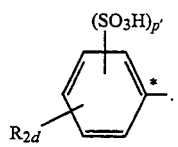

The group (b) is preferably (b$_1$) having the formula

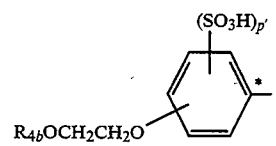

in which p' is as defined above.

More preferably it is (b$_2$) having the formula

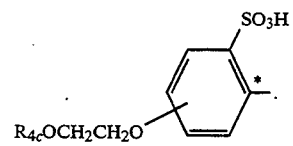

The group (c) is preferably (c$_1$) of the formula

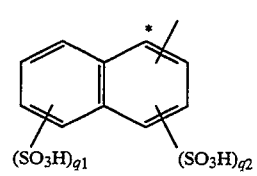

in which
q$_1$ is 0, 1 or 2,
q$_2$ is 0 or 1 and
q$_1$+q$_2$ is 1, 2 or 3.

More preferably it is (c$_2$) of the formula

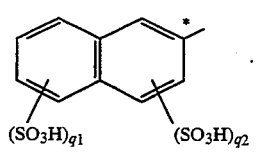

The group (d) is preferably (d$_1$) having the formula

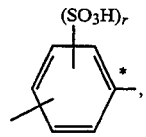

more preferably (d₂) of the formula

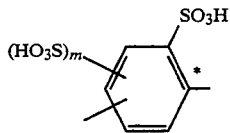

in which m is 0 or 1.

The group (e) is preferably (e₁) of the formula

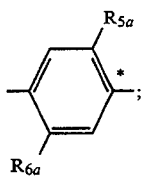

more preferably (e₂) of the formula

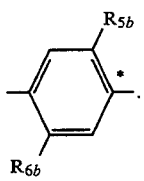

The group (f) is preferably (f₁) having the formula

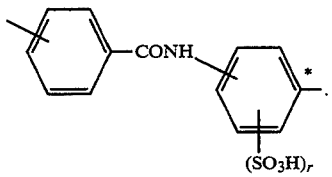

The group (g) is preferably (g₁) having the formula

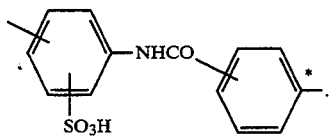

The group (h) is preferably (h₁) having the formula

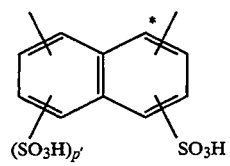

in which p' is as defined above.

D₁ is preferably D₁ₐ, where D₁ₐ is one of the groups (a₁) to (h₁). More preferably D₁ is D₁ᵦ, where D₁ᵦ is one of the groups (a₂), (b₂), (c₂), (d₂), (e₂), (f₁) and (g₁). Most preferably, D₁ is D₁c, where D₁c is one of the groups (a₂), (c₂), (d₂), (f₁) and (g₁).

In all the preferred groups mentioned above with respect to the definitions of D₁ₐ, D₁ᵦ and D₁c, each bond marked with an asterisk is attached to the azo group, and each other free bond is attached to —NR₁—(Z).

Q₁ is preferably Q₁ₐ, where Q₁ₐ is hydrogen, methyl, ethyl, cyclohexyl, phenyl, —COR₇ₐ, —CH₂SO₃H or —CH₂OSO₃H. More preferably Q₁ is Q₁ᵦ, where Q₁ᵦ is methyl, ethyl or —CH₂SO₃H. Most preferably Q₁ is methyl.

Q₂ is preferably Q₂ₐ, where Q₂ₐ is hydrogen, —CN, —SO, H, methyl, ethyl, —COR₇ₐ, —CH₂SO₃H, —CH₂OSO₃H, —CH₂COR₇ₐ or

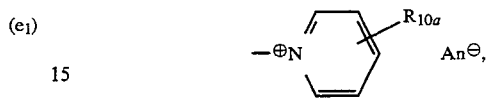

in which R₁₀ₐ is hydrogen, methyl or —CH₂CH₂OH.

More preferably Q₂ is Q₂ᵦ, where Q₂ᵦ is hydrogen, —SO₃H, methyl, ethyl, —COR₇ᵦ, —CH₂SO₃H, —CH₂OSO₃H or —CH₂COR₇ᵦ.

Most preferably Q₂ is Q₂c, where Q₂c is hydrogen, —CONH₂ or —CH₂SO₃H.

Preferably, when Q₃ or Q₃ₐ is a phenyl or phenylalkyl group bearing an —NR₁—Z group, it is otherwise unsubstituted.

Q₃ is preferably Q₃ₐ where Q₃ₐ is hydrogen; a bridging group —Y₁ₐ— as defined below which is attached to —NR₁—(Z); methyl; ethyl; cyclohexyl; phenyl or in which each phenyl ring is unsubstituted or substituted by 1 or 2 substituents selected from chlorine, methyl, methoxy, —SO₃H, —COOH and —NH₂, or bears a direct bond to —NR₁—(Z); or —C₁₋₄alkylene—Y₂ₐ in which Y₁ₐ is —C₂₋₄alkylene—, monohydroxy-substituted —C₃₋₄alkylene—,

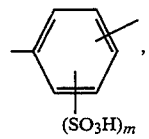

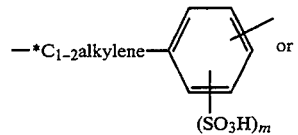

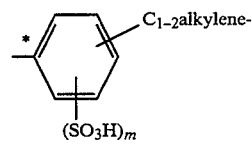

in which m is 0 or 1, and each asterisk identifies the carbon atom attached to the nitrogen of the pyridone ring,
or —Y₁ₐ—NR₁—(Z) is

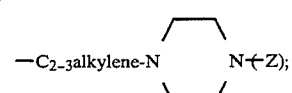

and $Y_{2a}$ is —COOH, —SO₃H, —OSO₃H, —OH, —CN, methoxy, —NR₁₁R₁₂ or —⊕NR₁₃R₁₄R₁₅ An⊖, wherein each $R_{11}$ and $R_{12}$, independently, is hydrogen; $C_{1-4}$alkyl; $C_{1-4}$alkyl monosubstituted by hydroxy, $C_{1-4}$alkoxy, —COOH, —SO₃H, —NHC$_{1-4}$alkyl or —N(C$_{1-4}$alkyl)₂; cyclohexyl; cyclohexyl substituted by 1 to 3 methyl groups; phenyl or phenyl(C$_{1-4}$alkyl) in which each phenyl ring is unsubstituted or substituted by 1 or 2 substituents selected from halogen, preferably chlorine, $C_{1-4}$alkyl, $C_{1-4}$alkoxy, —SO₃H and —COOH, or —NR₁₁R₁₂ forms a piperidine, morpholine or piperazine ring, which latter ring is unsubstituted or substituted by up to three methyl groups, each $R_{13}$ and $R_{14}$ independently has one of the significances of $R_{11}$ and $R_{12}$, but independent of $R_{11}$ and $R_{12}$, except hydrogen, and $R_{15}$ is $C_{1-4}$alkyl or benzyl, or —⊕NR₁₃R₁₄R₁₅ is a pyridinium group which is unsubstituted or substituted by one or two methyl groups and An⊖ is a non-chromophoric anion.

In any significance of $Y_1$ or $Y_{1a}$ having an alkylene radical and a free valence attached to a benzene ring, the alkylene radical and the free valence are preferably meta or para to each other.

In any chromophoric radical of formula (3) the positions of the two or three sulpho groups on the naphthalene ring with respect to the azo group are preferably as follows:

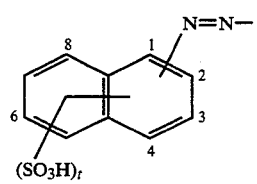

(i) —N═N— in the 1-position, t=2: the sulpho groups are preferably in positions 3,6; 3,8; 4,6 or 4,8;

(ii) —N═N— in the 2-position, t=2: the sulpho groups are preferably in positions 1,5; 3,6; 4,8; 5,7 or 6,8;

(iii) —N═N— in the 1-position, t=3: the sulpho groups are preferably in positions 3,6,8;

(iv) —N═N— in the 2-position, t=3: the sulpho groups are preferably in the positions 3,6,8 or 4,6,8.

In any chromophoric radical of formula (6) the positions of the two or three sulpho groups bound to the hydroxynaphthalene ring are preferably as follows:

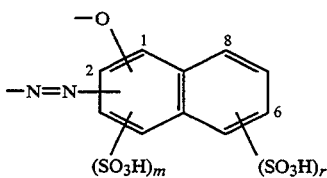

(v) —O— in the 1-position, —N═N— in the 2-position: the sulfo groups are preferably in the positions 3,6; 4,6 or 3,6,8;

(vi) —O— in the 2-position, —N═N— in the 1-position: the sulpho groups are preferably in positions 3,6; 6,8 or 3,6,8.

Preferred compounds of formula I correspond to formula Ia

in which $R_{1a}$ and Z are as defined above and [F$_c$′]NR$_{1a}$— is a chromophoric radical of one of the formulae

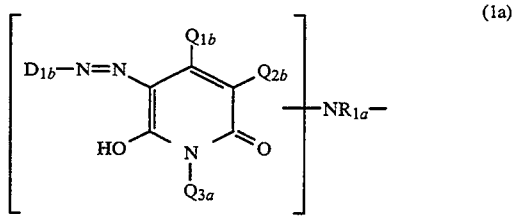

in which $D_{1b}$, $Q_{1b}$, $Q_{2b}$ and $Q_{3a}$ are as defined above and —NR$_{1a}$— is attached to Z, more preferably

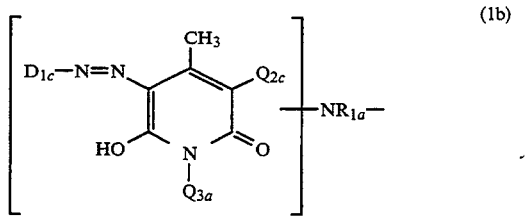

in which $D_{1c}$, $Q_{2c}$ and $Q_{3a}$ are as defined above and —NR$_{1a}$— is attached to Z;

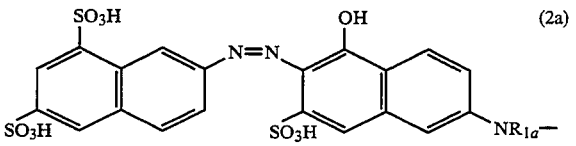

in which —NR$_{1a}$— is attached to Z;

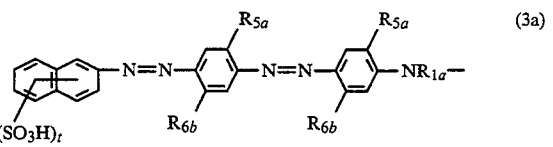

in which t and each $R_{5a}$ and each $R_{6b}$, independently, are as defined above, the t sulpho groups are in the preferred positions indicated for (ii) and (iv) and —NR$_{1a}$— is attached to Z, more preferably

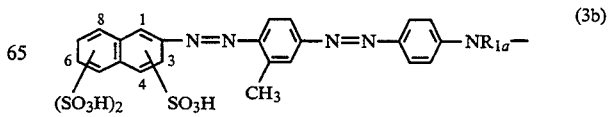

in which the sulpho groups are in the 3,6,8- or 4,6,8-positions of the naphthyl ring and —NR$_{1a}$— is attached to Z;

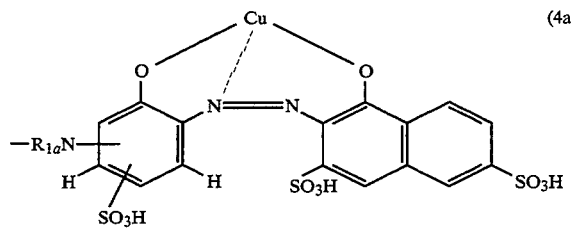
(4a)

in which —NR$_{1a}$— is attached to Z;

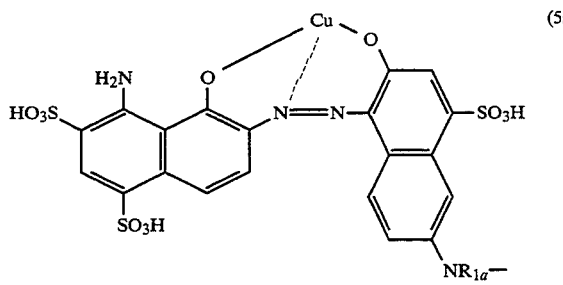
(5a)

which —NR$_{1a}$— is attached to Z;

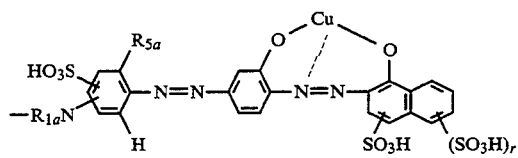
(6a)

in which R$_{5a}$ is as defined above and the two or three sulpho groups on the naphthyl ring are in the preferred positions indicated for (v), and —NR$_{1a}$— is attached to Z, more preferably (6b) being a radical of formula (6a) in which R$_{5a}$ is methoxy, r is 2 and the three sulpho groups are in the 3,6,8-positions of the naphthyl ring.

More preferred compounds of formula Ia are those in which R$_{1a}$ is R$_{1b}$, especially hydrogen.

Most preferred compounds of formula I correspond to formula Ib

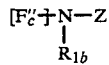 Ib in which R$_{1b}$ and Z are as defined above and [F$_c''$]NR$_{1b}$— is a chromophoric radical of one of the formulae (1b), (2a), (3b), (4a), (5a) and (6b) as defined above.

Especially preferred are compounds of formula Ib in which R$_{1b}$ is hydrogen.

In a compound of formula I the fibre-reactive group Z which is attached to the —NR$_1$-radical of the chromophoric radical according to the formula

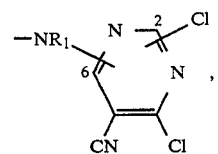

is not fixed at a certain carbon atom of the pyrimidine ring due to the non-selectivity of the reaction of 5-cyano-2,4,6-trichloropyrimidine with the amino group. Position isomers are possible with respect to the replaced chlorine, wherein the floating chloro substituent and —NR$_1$— group are in the 2,6- and 6,2-positions, respectively.

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetra-methylammonium, tri-ethylammonium and mono-, di- and tri-ethanolammonium.

The preferred cations are the alkali metal cations and ammonium, with sodium being the most preferred.

In a compound of formula I the cations of the sulpho and any carboxy groups can be the same or different, e.g., they can also be a mixture of the above-mentioned cations meaning that the compound of formula I can be in mixed salt form.

The present invention further provides a process for the preparation of compounds of formula I and mixtures thereof comprising reacting a compound of formula II

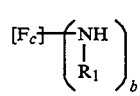 II in which F$_c$, R$_1$ and b are as defined above, or a mixture of compounds of formula II, with at least 6 moles of 5-cyano-2,4,6-trichloropyrimidine.

This condensation reaction is suitably carried out at 0°–40° C. and at pH 5–9; water is normally used as the reaction medium, but 5-cyano-2,4,6-trichloropyrimidine can also be added whilst dissolved in an organic solvent for example acetone.

Compounds of formula I in which [F$_c$]—NR$_1$)$_b$ is a chromophoric radical of formula (1) as defined above may also be prepared by reacting the diazonium salt of an amino compound of formula III

H$_2$N—D$_1$(NR$_1$—Z)$_{b1}$ III in which D$_1$ is one of the groups (a) to (h) as defined above in which each bond marked with an asterisk is attached to the —NH$_2$ group, R$_1$ and Z are as defined above and b$_1$ is as defined below, or a mixture thereof, with a compound of formula IV

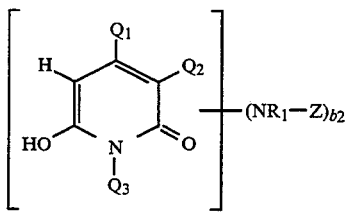

in which
Q$_1$, Q$_2$, Q$_3$, R$_1$ and Z are as defined above and b$_2$ is as defined below, or a mixture of compounds of formula IV, in which compounds of formulae III and IV
b$_1$ is 0 or 1,
b$_2$ is 0, 1 or 2, and
b$_1$+b$_2$ is 1 or 2.

This coupling reaction is suitably effected using an aqueous reaction medium at a weakly acidic pH, preferably at a pH of about 6.

The compounds of formula I may be isolated in accordance with known methods, for example, by conventional salting out with alkali metal salt, filtering and drying, optionally in vacuo and at slightly elevated temperatures.

Depending on the reaction and isolation conditions, a compound of formula I is obtained in free acid or preferably, salt form or even mixed salt form containing, for example, one or more of the above-mentioned cations. It may be converted from free acid form to a salt form or mixture of salt forms or vice versa or from one salt form to another by conventional means.

The starting compounds of formula II are either known or may be prepared in accordance with known methods using known starting material.

The starting compounds of formulae III and IV in which b$_1$ is 0 and b$_2$ is 0 are either known or may be prepared in accordance with known methods using appropriate known starting compounds.

Those starting compounds of formulae III and IV in which each b$_1$ and b$_2$ is other than 0 may be prepared by reacting a compound of formula IIIa or IVa

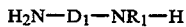

H$_2$N—D$_1$—NR$_1$—H            IIIa

IVa

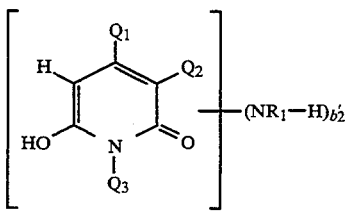

in which the symbols are as defined above and b'$_2$ is 1 or 2 with the appropriate amount of 5-cyano-2,4,6-trichloropyrimidine whilst protecting any additional free amino group intermediately if necessary.

The compounds of formula I and mixtures thereof are useful as fibre-reactive dyestuffs for dyeing or printing hydroxy group- or nitrogen-containing organic substrates. Preferred substrates are leather and fibre material containing or consisting of natural or synthetic polyamides and, particularly, of natural or regenerated cellulose such as cotton, viscose and spun rayon.-The most preferred substrate is textile material containing or consisting of cotton.

Dyeing or printing is effected in accordance with known methods conventional in the fibre-reactive dyestuff field. Preferably, for the compounds of formula I the exhaust dyeing method is used at temperatures within the range of 30° to 60° C.

The compounds of this invention are well compatible with other fibre-reactive dyes; they may be applied per se or in combination with appropriate fibre-reactive dyestuffs of the same class having analogous dyeing properties, e.g., concerning common fastness properties, extent of ability to exhaust from the dyebath onto the fibre etc. The dyeings obtained with such combination mixtures have good fastness properties and are comparable to those obtained with a single dyestuff.

The compounds of formula I are well soluble in electrolyte-containing dyebaths.

In view of their good build-up power the compounds of formula I give good exhaust and fixation yields. The portion of unfixed dyestuff can be easily washed off the substrate. The dyeings and prints obtained show good dry and wet light fastness and also good wet fastness properties such as wash, water, sea water and sweat fastness. They are resistant to oxidative influences, e.g., chlorinated water, hypochlorite bleach and peroxide- or perborate-containing wash liquors.

The following examples further serve to illustrate the invention. In the examples all parts and percentages are by weight or volume. The temperatures are in degrees Centigrade.

EXAMPLE 1

21.8 Parts of 5-cyano-2,4,6-trichloropyrimidine are stirred in 100 parts of an ice-water mixture for 30 minutes. To the suspension thus obtained the aqueous solution of 18.8 parts of 1,3-diaminobenzene-6-sulphonic acid, the pH of which solution has been adjusted to 5, is added dropwise whilst keeping the pH at 3.5 to 4.0 by adding 20 parts of 20% sodium carbonate solution. This pH of 3.5–4.0 is maintained until no compound containing two amino groups is any longer detectable. Then, the pH of the resultant mixture is rendered acidic by adding 25 parts of a 30% hydrochloric acid, and diazotization is effected by the addition of 25 parts of a 4N sodium nitrite solution. After diazotization has been completed, 23.3 parts of 1,4-dimethyl-6-hydroxy-3-sulphomethylpyridone-(2) are added as a 15% aqueous solution. Coupling is effected by raising the pH to 6 by adding 110 parts of 20% sodium carbonate solution. The dyestuff thus obtained which precipitates without adding sodium chloride and may be isolated by filtering and drying corresponds to the formula

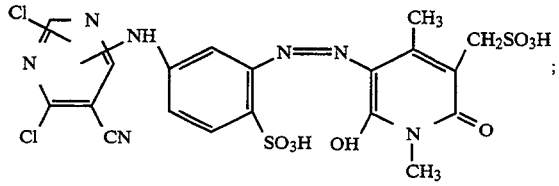

it dyes cotton a greenish yellow shade. The dyeings and prints on cotton obtained in accordance with conventional methods show good light and wet fastness properties, furthermore, they are resistant to oxidative influences.

EXAMPLES 2 TO 64

By analogy with the method described in Example 1, using appropriate starting compounds to form the desired chromophoric radical $F_c$, further compounds of formula I may be prepared which are listed in the following Tables 1 to 4. At the top of each Table the corresponding formula is given in which the symbols are as defined in the Table.

The compounds of Examples 2 to 64 may be applied to substrates containing or consisting of cellulose fibres, and particularly to textile material consisting of cotton, according to the conventional exhaust dyeing method or printing processes, where dyeings and prints of the indicated shade being obtained. The dyeings and prints on cotton show good light and wet fastness properties and are resistant to oxidative influences.

The dyestuffs listed in Tables 1 to 3 dye cotton a greenish-yellow-shade; for those dyes listed in Table 4 the shade of the obtained cotton dyeing is given in the last column I whereby a is greenish yellow and b is yellow.

TABLE 1 compounds of formula (A)

| Ex. No. | $R_{20}$ | $R_{21}$ | $Q_1$ | $Q_2$ | $Q_3$ |
|---|---|---|---|---|---|
| 2 | H | $SO_3H$ | $CH_3$ | $-CH_2SO_3H$ | $-CH_2CH_3$ |
| 3 | H | " | " | $SO_3H$ | $CH_3$ |
| 4 | $SO_3H$ | " | " | $-CONH_2$ | " |
| 5 | " | " | " | H | $-CH_2CH_3$ |
| 6 | H | " | COOH | H | H |
| 7 | H | " | $-CH_2SO_3H$ | $-CONH_2$ | $CH_3$ |
| 8 | H | " | $CH_3$ | H | $-CH_2CH_2SO_3H$ |
| 9 | $SO_3H$ | " | " | H | $-(CH_2)_3NHCH_3$ |
| 10 | " | " | " | $-CONH_2$ | $-CH_2CH_3$ |
| 11 | " | " | COOH | H | H |
| 12 | " | " | $CH_3$ | $-CONH_2$ | $CH_3$ |
| 13 | H | " | " | $-CH_2SO_3H$ | H |
| 14 | H | H | $-CH_2SO_3H$ | H | $CH_3$ |
| 15 | H | H | $CH_3$ | $-CH_2SO_3H$ | $-CH_2CH_3$ |
| 16 | H | H | " | " | $-(CH_2)_3N(C_2H_5)_2$ |
| 17 | H | $SO_3H$ | " | $-CONH_2$ | $-CH_2CH_2OH$ |
| 18 | H | " | " | H | " |

TABLE 2 compounds of formula (B)

| Ex. No. | $R_{20}$ | $Q_1$ | $Q_2$ | $Q_3$ | position of $-NH-Z$ |
|---|---|---|---|---|---|
| 19 | H | $CH_3$ | $-CH_2SO_3H$ | H | 3 |
| 20 | H | " | " | $CH_3$ | 4 |
| 21 | H | " | " | $-CH_2CH_3$ | 3 |
| 22 | H | COOH | H | H | 3 |
| 23 | H | $CH_3$ | $SO_3H$ | H | 3 |
| 24 | $SO_3H$ | " | $-CH_2SO_3H$ | H | 4 |
| 25 | " | " | $-CONH_2$ | $-CH_2CH_3$ | 4 |
| 26 | H | " | $-CH_2SO_3H$ | " | 4 |
| 27 | H | $-CH_2SO_3H$ | $-CONH_2$ | $CH_3$ | 3 |
| 28 | $SO_3H$ | $CH_3$ | H | $-CH_2CH_2SO_3H$ | 4 |
| 29 | H | $-CH_2SO_3H$ | $-CH_2SO_3H$ | $CH_3$ | 3 |
| 30 | $SO_3H$ | $CH_3$ | $-CONH_2$ | $-CH_2CH_2SO_3H$ | 4 |
| 31 | H | " | H | $-CH_2CH_3$ | 4 |
| 32 | $SO_3H$ | " | H | $-CH_2CH_2OH$ | 3 |

TABLE 3 compounds of formula (C)

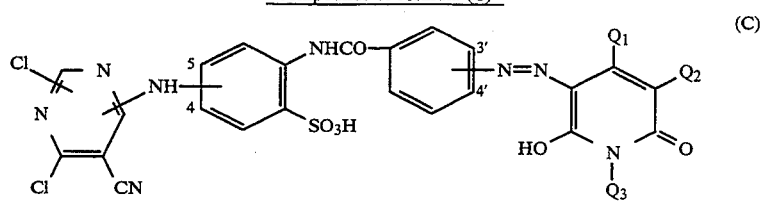

| Ex. No. | —NH—Z in position | —N=N— in position | $Q_1$ | $Q_2$ | $Q_3$ |
|---|---|---|---|---|---|
| 33 | 5 | 3' | $CH_3$ | $-CH_2SO_3H$ | H |
| 34 | 5 | 4' | " | " | $CH_3$ |
| 35 | 4 | 4' | " | " | $-CH_2CH_3$ |
| 36 | 4 | 3' | " | " | H |
| 37 | 5 | 3' | COOH | H | H |
| 38 | 5 | 4' | " | H | $-CH_2CH_3$ |
| 39 | 4 | 3' | $CH_3$ | $-CONH_2$ | " |
| 40 | 5 | 4' | $-CH_2SO_3H$ | " | $CH_3$ |
| 41 | 5 | 4' | $CH_3$ | H | $-CH_2CH_2SO_3H$ |
| 42 | 4 | 4' | " | $-CONH_2$ | " |
| 43 | 5 | 3' | $-CH_2SO_3H$ | $-CH_2SO_3H$ | $CH_3$ |
| 44 | 5 | 3' | $CH_3$ | H | $-CH_2CH_3$ |
| 45 | 4 | 3' | " | H | " |
| 46 | 4 | 4' | " | H | $-CH_2CH_2OH$ |
| 47 | 5 | 3' | " | H | " |

TABLE 4 compounds of formula (D)

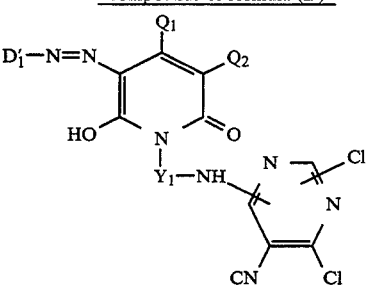

| Ex. No. | $D_1'$ | $Q_1$ | $Q_2$ | $-Y_1-NH-$ | I |
|---|---|---|---|---|---|
| 48 | ![2-SO3H-phenyl] | $CH_3$ | $-CONH_2$ | $-CH_2CH_2NH-$ | a |
| 49 | ![3-SO3H-phenyl] | " | H | $-CH_2CHNH-$<br>        \|<br>       $CH_3$ | a |
| 50 | ![4-SO3H-phenyl] | " | $-CH_2SO_3H$ | $-(CH_2)_3N-$<br>       \|<br>     $CH_3$ | a |
| 51 | ![naphthyl-1,5-disulfonic acid] | " | $-SO_3H$ | $-CH_2CH_2-N\diagdown{}N-$ (piperazine) | a |

TABLE 4-continued compounds of formula (D)

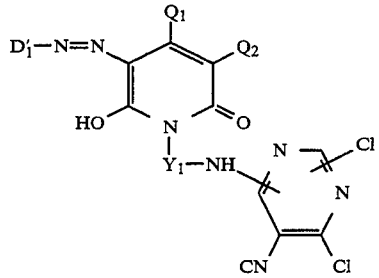

(D)

| Ex. No. | D$_1'$ | Q$_1$ | Q$_2$ | —Y$_1$—NH— | I |
|---|---|---|---|---|---|
| 52 | HO$_3$S-naphthyl-SO$_3$H (with CH$_3$) | " | —CH$_2$SO$_3$H | —CH$_2$CH$_2$NH— | b |
| 53 | SO$_3$H, SO$_3$H, SO$_3$H naphthyl (with CH$_3$) | " | —CONH$_2$ | —(CH$_2$)$_3$N— <br>            CH$_3$ | a |
| 54 | SO$_3$H, SO$_3$H, SO$_3$H naphthyl (with CH$_3$) | —CH$_2$SO$_3$H | H | —CH$_2$CHNH— <br>         CH$_3$ | b |
| 55 | HO$_3$S, SO$_3$H, SO$_3$H naphthyl (with CH$_3$) | CH$_3$ | H | —CH$_2$CH$_2$NH— | b |
| 56 | SO$_3$H, SO$_3$H naphthyl (with CH$_3$) | —CH$_2$SO$_3$H | —CH$_2$SO$_3$H | —CH$_2$CH$_2$NH— | b |
| 57 | SO$_3$H, HO$_3$S phenyl (with CH$_3$) | CH$_3$ | —CONH$_2$ | —CH$_2$CHNH— <br>         CH$_3$ | a |
| 58 | SO$_3$H, SO$_3$H phenyl | " | H | —CH$_2$CH$_2$NH— | a |
| 59 | SO$_3$H, SO$_3$H phenyl (with H$_3$C—) | " | —CH$_2$SO$_3$H | —(CH$_2$)$_3$N— <br>            CH$_3$ | b |

TABLE 4-continued compounds of formula (D)

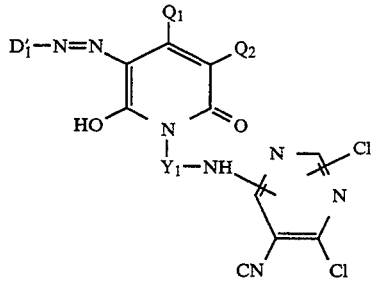

(D)

| Ex. No. | $D_1'$ | $Q_1$ | $Q_2$ | $-Y_1-NH-$ | I |
|---|---|---|---|---|---|
| 60 | ![3-SO3H, 4-CH3, 5-SO3H phenyl] HO3S-, CH3, SO3H substituted benzene | " | " | $-CH_2CHNH-$<br>$\quad\mid$<br>$\quad CH_3$ | b |
| 61 | 2-SO3H, 4-Cl phenyl | $-CH_2SO_3H$ | $-CONH_2$ | $-(CH_2)_3N-$<br>$\quad\mid$<br>$\quad CH_3$ | a |
| 62 | 2-SO3H, 4-NHCOCH3, 5-SO3H phenyl | $CH_3$ | $-CH_2SO_3H$ | " | a |
| 63 | HO3S-, NHCO-phenyl substituted benzene | " | " | $-CH_2CHNH-$<br>$\quad\mid$<br>$\quad CH_3$ | a |
| 64 | 2-SO3H, 4-NHCO-phenyl, 5-SO3H benzene | " | " | $-(CH_2)_3N-$<br>$\quad\mid$<br>$\quad CH_3$ | a |

EXAMPLE 65

123 Parts of 6-acetylamino-2-amino-1-hydroxybenzene-4-sulphonic acid are stirred into 250 parts of water and 250 parts of ice whilst adding 40 parts of 30% hydrochloric acid. 125 Parts of a 4N sodium nitrite solution are slowly added, and diazotization is effected at 0° to a maximum of +5°. When the reaction is completed any excess nitrite is decomposed by adding a small amount of sulphamic acid.

152 Parts of 1-hydroxynaphthalene-3,6-disulphonic acid are dissolved in 500 parts of water, and the solution is cooled by adding 250 parts of ice. Subsequently, the above cooled diazonium salt solution is slowly added whilst stirring. The resultant mixture is stirred for one further hour. During the coupling reaction the pH of the mixture is maintained at 11.5–12.5 by continuously adding an appropriate amount of caustic lime.

The solution of the coupling product thus obtained is heated to 50°. A solution of 125 parts of copper sulphate pentahydrate in 300 parts of water is added thereto within 30 minutes. The reaction product is salted out and isolated by filtering.

The filter residue which has been squeezed out well is stirred into 50 parts of a 30% sodium hydroxide solution. The pH of the mixture is made strongly basic by adding 70 parts of 30% sodium hydroxide. Stirring is effected at the boil for 90 minutes. Then the pH of the mixture is made acidic by adding 200 parts of 30 % hydrochloric acid. From the thick suspension thus formed the copper complex of the amino monoazo dyestuff is obtained by filtration. The residue is pressed out well and is dried in vacuo at 80°.

17.4 Parts of the dyestuff prepared according to the method as described above are dissolved in 300 parts of water and a small amount of a 10% sodium hydroxide solution at pH 8 whilst stirring well. To this solution which has been cooled to 14° with 100 parts of ice, 10.4 parts of 5-cyano-2,4,6-trichloropyrimidine in a small amount of acetone are added. The pH which decreases spontaneously is kept at 7 while adding a 20% sodium carbonate solution during the whole condensation reaction. Simultaneously, the reaction mixture is heated to 35°. After about 40 minutes the pH remains nearly unchanged and after a total of two hours the reaction is completed. The resultant fine suspension is filtered cold, and the residue is dried at 40° in vacuo. The dyestuff thus obtained having the formula

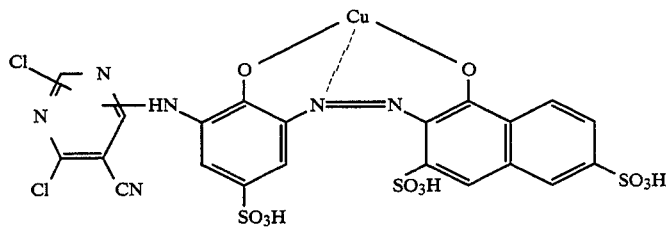

dyes cotton or regenerated cellulose fibres a ruby shade; the dyeings show high light and wet fastness properties and are resistant to oxidative influences.

EXAMPLE 66 a) 191.6 Parts of 2-aminonaphthalene-3,6,8-trisulphonic acid are stirred in 1000 parts of water and dissolved by adding 60 parts of a 30% sodium hydroxide solution. Within 30 minutes 190 parts of 30% hydrochloric acid are added dropwise. The suspension thus formed is stirred for a further few hours; then 250 parts of ice are added. 130 parts of a 4N sodium nitrite solution are added dropwise at 0°-5° to the cooled suspension within about 30 minutes whilst keeping the temperature at 0°-5° by the addition of a total of 250 parts of ice. After about two hours diazotization is completed.- Any excess nitrite is decomposed by adding sulphamic acid.

b) 97.5 Parts of m-toluidine-ω-methanesulphonic acid are stirred into 200 parts of an ice-water mixture. 20 Parts of sodium bicarbonate are added, and then the mixture is cooled to 5°-10°. To this mixture the diazo suspension prepared according to step a) is added slowly at 5°-10°, whilst keeping the pH at 5.5-6.0 by adding a 20% sodium carbonate solution. Coupling is completed after about two hours. The reaction mixture is then heated to 40° and is made alkaline (pH 13.8) by adding 245 parts of a 30% sodium hydroxide solution. Subsequently, 70 parts of a 35% hydrogen peroxide solution are added within 30 minutes. Stirring is effected at 40°-50° for one hour and the pH is then adjusted to 5 by the addition of 200 parts of 30% hydrochloric acid, whereby a dark brown crystalline precipitate is formed. The precipitation of the dye is completed by adding 270 parts of sodium chloride and stirring overnight. The residue obtained by filtration is dried at 60° in vacuo. The product (66A) is obtained having the formula

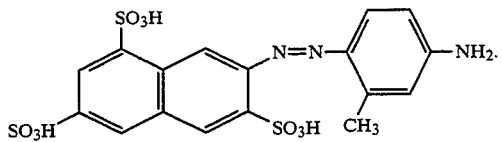

c) To 139 parts of the product (66A) which are stirred into 1500 parts of water, 200 parts of ice and then 75 parts of a 4N sodium nitrite solution are added. Within 5 minutes 75 parts of 30% hydrochloric acid are added resulting in a pH less than 1. After 90 minutes diazotization is completed, and any excess nitrite is decomposed with sulphamic acid.

d) 52.9 Parts of anilinemethanesulphonic acid are stirred into 100 parts of water to which 16 parts of sodium acetate are added. The mixture is cooled to 5°-10° in an ice bath. At 5°-10° the diazo suspension prepared in step c) is pumped into the mixture within 30 minutes whilst keeping the pH at 4.5-5.0 by adding a 20% sodium carbonate solution. The temperature of the reaction mixture is allowed to rise to room temperature and further stirring is effected overnight at pH 4.5-5.0. The coupling product is saponified by heating to 40° at pH 12.7 which has been adjusted by adding 140 parts of a 30% sodium hydroxide solution. Within 45 minutes 40 parts of a 35% hydrogen peroxide solution are added, and stirring is effected for one hour at 55°-65°. The mixture is then cooled to room temperature, and the pH is adjusted at 5.7 by adding 80 parts of 30% hydrochloric acid. The amino disazo compound thus formed is salted out with 600 parts of calcium chloride whilst cooling to room temperature. After stirring overnight, the dyestuff is filtered off and the press cake is dried at 80°. The product (66B) is obtained having the formula

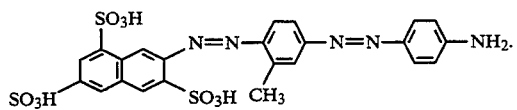

e) 18.2 Parts of the product (66B) are stirred into 400 parts of water. The pH of the mixture is adjusted at 7.2 by the addition of 2 parts of a 30% sodium hydroxide solution. The mixture is cooled to 10°-15°, and then 7.5 parts of 5-cyano-2,4,6-trichloropyrimidine (20% excess) are added. By the addition of a 20% sodium carbonate solution the pH is kept at 7.0-7.5, and the reaction mixture is heated to 35°. After about five hours at pH 7.0-7.5 (and after the addition of a further 5% of 5-cyano-2,4,6-trichloropyrimidine) the reaction is completed. To isolate the product the reaction mixture is cooled to room temperature and then filtered. The resulting press cake which contains sodium chloride is stirred in 200 parts of water, then filtered and dried at 40°. The dyestuff thus obtained having the formula

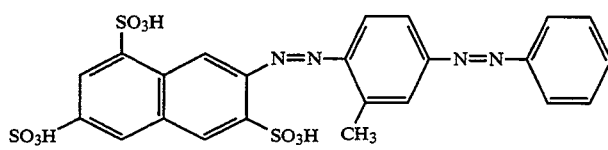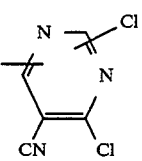

dyes cotton or regenerated cellulose fibres an orange shade. The dyeings show notably good light and wet fastness properties and they are resistant to oxidative influences.

EXAMPLE 67

If according to the method described in Example 66 the 52.9 parts of anilinemethanesulphonic acid are replaced with 30 parts of N-methylaniline and otherwise the same procedure as described in Example 66 is applied (with the exception that no saponification is needed), the dyestuff of the formula

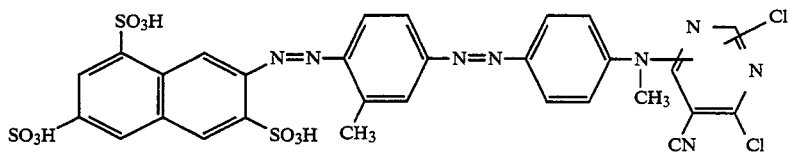

is obtained which dyes cotton or regenerated cellulose fibres an orange shade. The dyeings show good fastness properties.

EXAMPLES 68 TO 83

By analogy with the method described in Example 66 or 67, using appropriate starting compounds, further compounds of formula I may be prepared which are listed in the following Table 5. They correspond to formula E

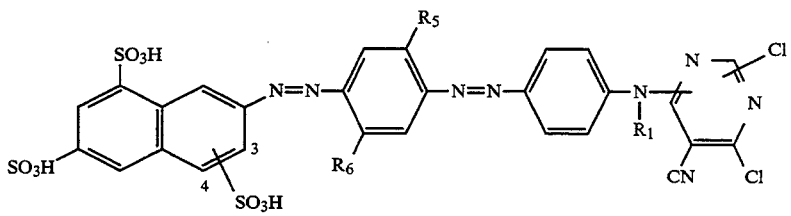

in which the symbols are as defined in Table 5.

The compounds of Examples 68 to 83 may be applied to substrates containing or consisting of cellulose fibres, and particularly to textile material consisting of cotton, according to the conventional exhaust dyeing method or printing processes, where orange cotton dyeings are obtained. The dyeings and prints show good light and wet fastness properties and are resistant to oxidative influences.

TABLE 5

| Ex. No. | position of SO$_3$H | R$_5$ | R$_6$ | R$_1$ |
|---|---|---|---|---|
| 68 | 4 | H | CH$_3$ | H |
| 69 | 4 | H | " | CH$_3$ |
| 70 | 3 | H | C$_2$H$_5$ | H |
| 71 | 3 | H | H | H |
| 72 | 3 | H | H | CH$_3$ |
| 73 | 4 | H | H | C$_2$H$_5$ |
| 74 | 3 | H | —NHCOCH$_3$ | H |
| 75 | 4 | H | —NHCONH$_2$ | CH$_3$ |
| 76 | 3 | H | —NHCOCH$_3$ | " |
| 77 | 3 | H | CH$_3$ | C$_2$H$_5$ |
| 78 | 4 | H | " | " |
| 79 | 3 | OCH$_3$ | " | H |
| 80 | 3 | " | H | H |
| 81 | 4 | " | H | CH$_3$ |
| 82 | 4 | CH$_3$ | CH$_3$ | H |
| 83 | 3 | " | " | CH$_3$ |

EXAMPLE 84

30.3 Parts of 2-aminonaphthalene-6,8-disulphonic acid are dissolved in 300 parts of water. After the addition of 25 parts of 30% hydrochloric acid, diazotization is effected at 0°-2° for 20 minutes with 6.9 parts of sodium nitrite which are dissolved in 24 parts of water. The resulting diazonium compound is added to 30.3 parts of the sodium salt of 2-acetylamino-5-hydroxynaphthalene-7-sulphonic acid which were dissolved in 200 parts of water at 30°-35°. During coupling, the pH of the reaction mixture is kept at 6.5 to 7.0 by adding sodium carbonate solution, and the temperature is kept at 10°-20°. When coupling is completed, 37 parts of sodium hydroxide are added to the solution and the mixture is stirred at 90°-95° for one hour whereby the acetyl group is split off. The amino azo dyestuff thus formed is salted out with sodium chloride and filtered. A paste is obtained which is dissolved in 600 parts of water. The pH of this solution is adjusted at 6 by adding hydrochloric acid. Within 30 minutes 19.2 parts of 5-cyano-2,4,6-trichloropyrimidine dissolved in 95 parts of acetone are added dropwise at 30°-35°. Stirring is effected at pH 6.5-7.0 until a free amino group is no longer detectable. During the condensation reaction the indicated pH range is maintained by adding dilute sodium carbonate solution. After the condensation is completed the product is salted out with sodium chloride, filtered and dried. The dyestuff having the formula

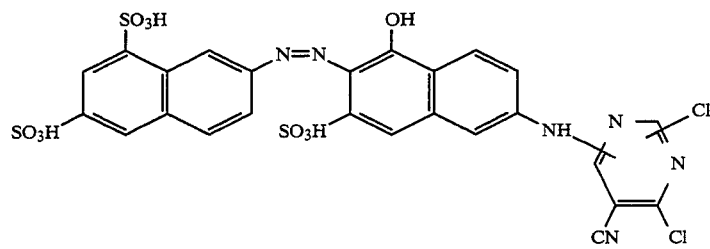

is obtained in form of a dark red powder which dissolves in water with red colour. It dyes cotton a scarlet shade. These dyeings have good fastness properties.

EXAMPLE 85

12.9 Parts of the chromophoric compound corresponding to the formula

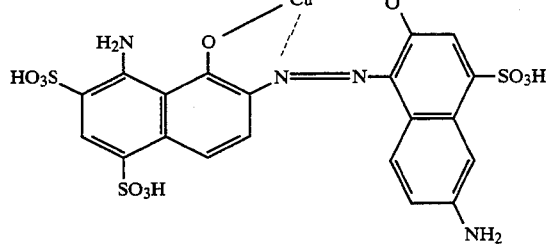

which may be prepared in accordance with known methods, are suspended in 100 parts of water. At 5°–10°, 4.4 parts of 5-cyano-2,4,6-trichloropyrimidine are added to the suspension whilst keeping the pH at 6.0 to 6.5 by the addition of 4 parts of a 30% sodium hydroxide solution. After about one hour the condensation is completed. The dyestuff having the formula

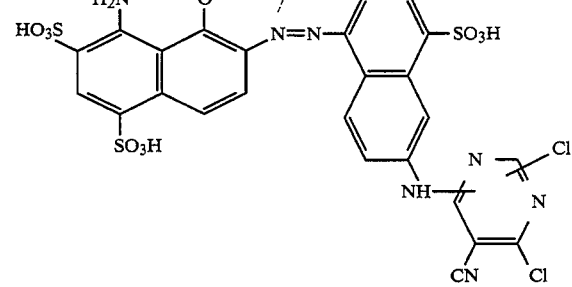

is isolated by salting out, filtering and drying. It dyes cotton and regenerated cellulose fibres a dark blue shade. These dyeings have good light and wet fastness properties and are resistant to oxidative influences.

EXAMPLE 86

23.8 Parts of the chromophoric compound of the formula

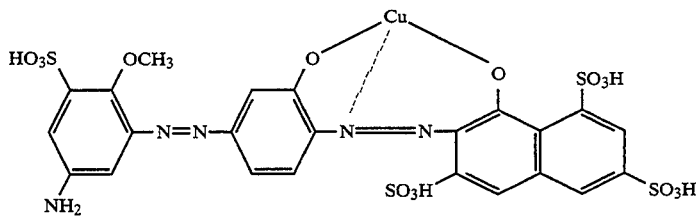

which has been prepared as follows:
by coupling of diazotized 5-acetylamino-1-amino-2-methoxybenzene-3-sulphonic acid with o-anisidine-ω-methanesulphonic acid, alkaline saponification of the ω-methane sulphonic acid radical, again diazotizing and coupling with 1-hydroxynaphthalene-3,6,8-trisulphonic acid, followed by alkaline demethylating coppering whereby the acetylamino group is hydrolyzed;
are dissolved in 300 parts of water at pH 8.5 with the addition of a small amount of sodium hydroxide solution. The mixture is cooled to 5°–10° with ice, and then 10.4 parts of 5-cyano-2,4,6-trichloropyrimidine in a small amount of acetone are added. The pH of the reaction mixture is kept at 8.5 to 9.0 by adding a 20% sodium carbonate solution. After about two hours the reaction is completed and the resultant solution is filtered clear. For isolating, the product is salted out with sodium chloride and filtered, and the residue is dried in vacuo at slightly elevated temperature. The dyestuff thus obtained having the formula

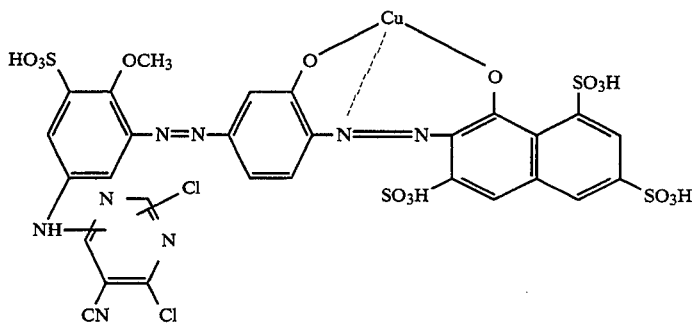

dyes cotton or regenerated cellulose fibres a blue shade. These dyeings show good light and wet fastness properties and are resistant to oxidative influences.

EXAMPLES 87 TO 97

By analogy with the method described in Example 86, using appropriate starting compounds, further compounds of formula I may be prepared which are listed in the following Table 6. They correspond to the formula (F)

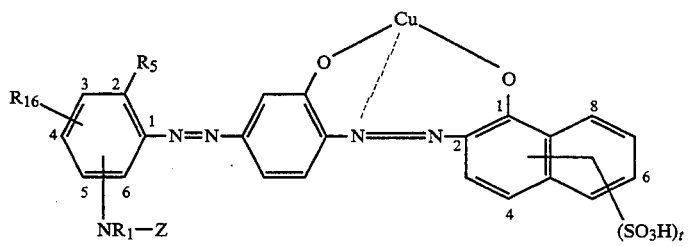

in which Z is as defined above and the other symbols are as defined in the Table below.

The compounds of Examples 87 to 97 dye cotton a blue shade. These cotton dyeings have good light and wet fastness properties and are resistant to oxidative influences.

TABLE 6 compounds of formula (F)

| Ex. No. | $R_5$ | $R_{16}$ (position) | $R_1$ | position of $-NR_1-Z$ | t | position of the $(SO_3H)_t$ in the naphthol ring |
|---|---|---|---|---|---|---|
| 87 | OCH₃ | 3-SO₃H | H | 5 | 2 | 3,6 |
| 88 | " | " | CH₃ | 5 | 3 | 3,6,8 |
| 89 | " | H | H | 4 | 3 | 3,6,8 |
| 90 | " | 3-SO₃H | H | 5 | 2 | 3,8 |
| 91 | H | " | H | 5 | 3 | 3,6,8 |
| 92 | H | " | H | 4 | 2 | 4,6 |
| 93 | CH₃ | " | H | 5 | 3 | 3,6,8 |
| 94 | " | H | CH₃ | 4 | 3 | 3,6,8 |
| 95 | H | 4-SO₃H | H | 3 | 2 | 3,6 |
| 96 | H | " | H | 3 | 3 | 3,6,8 |
| 97 | OCH₃ | 3-SO₃H | H | 5 | 3 | 4,6,8 |

In accordance with the method as described the dyestuffs of Examples 1 to 97 are obtained in sodium salt form. They may, depending on the reaction/isolation conditions or by reacting the sodium salts in accordance with known methods, also be obtained in free acid form or in other salt forms, for example those salt forms containing one or more cations indicated in the description above.

The dyes of Examples 1-97 (and the corresponding free acids and other salt forms) contain the compound wherein the floating chloro substituent on the pyrimidine ring is in the 2-position and the corresponding compound wherein it is in the 6-position, with the former usually predominating, often by a ratio of about 2:1.

In the following examples the application of the compounds of this invention is illustrated.

Application Example A 0.3 Parts of the dyestuff of Example 1 are dissolved in 300 parts of demineralised water and 15 parts of Glauber's salt (calcined) are added. The dyebath is heated to 40° then 10 parts of cotton fabric (bleached) are added. After 30 minutes at 40°, 6 parts of sodium carbonate (calcined) are added to the bath portionwise every 10 minutes applying quantities of 0.2, 0.6, 1.2 and finally 4.0 parts thereof. During the addition of sodium carbonate the temperature is kept at 40°. Subsequently, dyeing is effected for a further one hour at 40°.

The dyed fabric is then rinsed with running cold water for 3 minutes and afterwards with running hot water for a further 3 minutes. The dyeing is washed at the boil for 15 minutes in 500 parts of demineralised water in the presence of 0.25 parts of Marseilles soap. After being rinsed with running hot water (for 3 minutes) and centrifuged, the dyeing is dried in a cabinet dryer at about 70°. A greenish-yellow cotton dyeing is obtained showing good light and wet fastness properties which is stable towards oxidative influences.

Application Example B

To a dyebath containing in 300 parts of demineralised water 10 parts of Glauber's salt (calcined), 10 parts of cotton fabric (bleached) are added. The bath is heated to 40° within 10 minutes, and 0.5 parts of the dyestuff of Example 1 are added. After a further 30 minutes at 40° 3 parts of sodium carbonate (calcined) are added and dyeing is continued at 40° for a further 45 minutes.

The dyed fabric is rinsed with running cold and then hot water and washed at the boil according to the method given in Application Example A. After rinsing and drying a greenish-yellow cotton dyeing is obtained which has the same good fastness properties as indicated in Application Example A.

Similarly, the dyestuffs of Examples 2-97 or mixtures of the exemplified dyestuffs may be employed to dye cotton in accordance with the method described in Application Example A or B.

Application Example C

A printing paste consisting of

| |
|---|
| 40 parts of the dyestuff of Example 1 |
| 100 parts of urea |
| 350 parts of water |
| 500 parts of a 4% sodium alginate thickener and |
| 10 parts of sodium bicarbonate |
| 1000 parts in all | is applied to cotton fabric in accordance with conventional printing methods.

The printed fabric is dried and fixed in steam at 102°-104° for 4-8 minutes. It is rinsed in cold and then hot water, washed at the boil (according to the method described in Application Example A) and dried. A greenish yellow print is obtained which has good general fastness properties.

Similarly, the dyestuffs of Examples 2 to 97 or mixtures of the exemplified dyestuffs may be employed to print cotton in accordance with the method given in Application Example C. All prints obtained show good fastness properties.

What is claimed is:

1. A compound of the formula

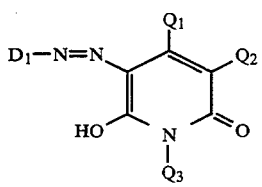

or

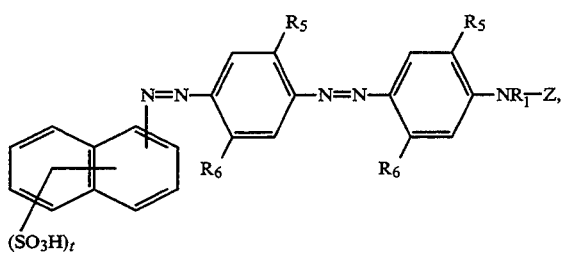

or a water-soluble salt thereof each cation of which is independently a non-chromophoric cation, or a mixture of such compounds or water-soluble salts,
wherein
$D_1$ is

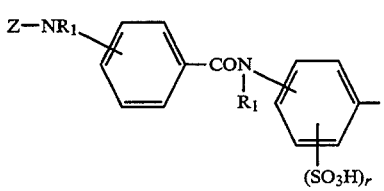

or

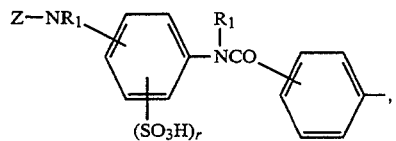

wherein
r is 1 or 2,
$Q_1$ is hydrogen; $C_{1-4}$alkyl; $C_{5-6}$cycloalkyl; phenyl; phenyl substituted by 1 to 3 substituents selected from $C_{1-4}$alkyl, $C_{1-4}$alkoxy, halo, —COOH and —SO$_3$H; phenyl($C_{1-4}$alkyl); phenyl($C_{1-4}$alkyl) the phenyl ring of which is substituted by 1 to 3 substituents selected from $C_{1-4}$alkyl, $C_{1-4}$alkoxy, halo, —COOH and —SO$_3$H; —COR$_7$; or $C_{1-4}$alkyl monosubstituted by —SO$_3$H, —OSO$_3$H or —COR$_7$,
$Q_2$ is hydrogen; cyano; nitro; —SO$_3$H; —COR$_7$; $C_{1-4}$alkyl; $C_{1-4}$alkyl monosubstituted by hydroxy, halo, cyano, $C_{1-4}$alkoxy, —SO$_3$H, —OSO$_3$H, —COR$_7$, —NH$_2$ or 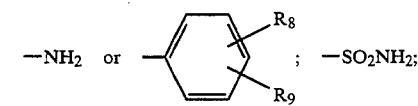 ; —SO$_2$NH$_2$;

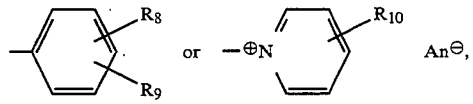

wherein
$R_8$ is hydrogen, halo, $C_{1-4}$alkyl, $C_{1-4}$alkoxy, —COOH or —SO$_3$H,
$R_9$ is hydrogen, —SO$_3$H or —NR$_1$—Z, and
$R_{10}$ is hydrogen, $C_{1-4}$alkyl or $C_{2-4}$hydroxyalkyl,
$Q_3$ is hydrogen; —Y$_1$—NR$_1$—Z; $C_{1-6}$alkyl; $C_{2-4}$alkenyl; $C_{2-4}$alkynyl; $C_{5-6}$cycloalkyl; —W—Y$_2$; phenyl; phenyl monosubstituted by —NR$_1$—Z; phenyl substituted by 1 to 3 substituents selected from halo, $C_{1-4}$alkyl, $C_{1-4}$alkoxy, —SO$_3$H, —COOH and —NH$_2$; phenyl substituted by one —NR$_1$—Z and by 1 to 3 substituents selected from halo $C_{1-4}$alkyl, $C_{1-4}$alkoxy, —SO$_3$H, —COOH and —NH$_2$; phenyl($C_{1-4}$alkyl); phenyl($C_{1-4}$alkyl) the phenyl ring of which is monosubstituted by —NR$_1$—Z; phenyl($C_{1-4}$alkyl) the phenyl ring of which is substituted by 1 to 3 substituents selected from halo, $C_{1-4}$alkyl, $C_{1-4}$alkoxy, —SO$_3$, —COOH and —NH$_2$; or phenyl($C_{1-4}$alkyl) the phenyl ring of which is substituted by one —NR$_1$—Z and by 1 to 3 substituents selected from halo, $C_{1-4}$alkyl, $C_{1-4}$alkoxy, —SO$_3$H, —COOH and —NH$_2$,
wherein
W is linear or branched $C_{1-6}$alkylene,
$Y_1$ is linear or branched $C_{2-6}$alkylene; linear or branched $C_{3-6}$alkylene monosubstituted by hydroxy; linear or branched $C_{2-6}$alkylene interrupted by —O— or —NR$_1$—;

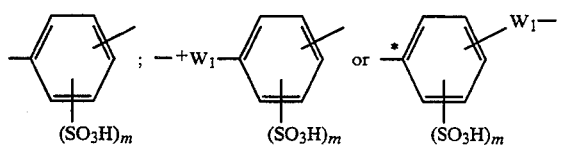

wherein
W₁ is linear or branched $C_{1-4}$alkylene,
the asterisk denotes the carbon atom attached to the nitrogen atom of the pyridone ring, and
m is 0 or 1, or

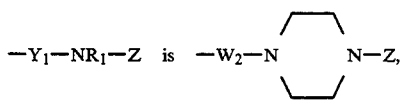

wherein
W₂ is linear or branched $C_{2-4}$alkylene, and
Y₂ is —COOH, ($C_{1-4}$alkoxy)carbonyl, —SO₃H, —O-SO₃H, hydroxy, cyano, $C_{1-4}$alkoxy, —NR₁₁R₁₂ or $^{\oplus}NR_{13}R_{14}R_{15}$ An$^{\ominus}$,
wherein
each of R₁₁ and R₁₂ is independently hydrogen; $C_{1-4}$alkyl; $C_{1-4}$alkyl monosubstituted by hydroxy, $C_{1-4}$alkoxy, —COOH, —SO₃H, $C_{1-4}$alkylamino or N,N-di-($C_{1-4}$alkyl)amino; cyclohexyl; cyclohexyl substituted by 1 to 3 methyl groups; phenyl; phenyl substituted by 1 or 2 substituents selected from halo, $C_{1-4}$alkyl, $C_{1-4}$alkoxy, —SO₃H and —COOH; phenyl($C_{1-4}$alkyl) or phenyl($C_{1-4}$alkyl) the phenyl ring of which is substituted by 1 or 2 substituents selected from halo, $C_{1-4}$alkyl, $C_{1-4}$alkoxy, —SO₃H and —COOH, or
—NR₁₁R₁₂ is piperidino, morpholino, piperazino or piperazino substituted by 1 to 3 methyl groups,
each of R₁₃ and R₁₄ is independently $C_{1-4}$alkyl; $C_{1-4}$alkyl monosubstituted by hydroxy, $C_{1-4}$alkoxy, —COOH, —SO₃H, $C_{1-4}$alkylamino or N,N-di-($C_{1-4}$alkyl)amino; cyclohexyl; cyclohexyl substituted by 1 to 3 methyl groups; phenyl; phenyl substituted by 1 or 2 substituents selected from halo, $C_{1-4}$alkyl, $C_{1-4}$alkoxy, —SO₃H and —COOH; phenyl($C_{1-4}$alkyl) or phenyl($C_{1-4}$alkyl) the phenyl ring of which is substituted by 1 or 2 substituents selected from halo, $C_{1-4}$alkyl, $C_{1-4}$alkoxy, —SO₃H and —COOH, and
R₁₅ is $C_{1-4}$alkyl or benzyl, or
—$^{\oplus}NR_{13}R_{14}R_{15}$ is N—R₁₅-piperidinium, N—R₁₅-morpholinium, N—R₁₅-piperazinium, N—R₁₅-piperazinium substituted by 1 to 3 methyl groups, pyridinium or pyridinium substituted by one or two methyl groups,
wherein
R₁₅ is $C_{1-4}$alkyl or benzyl,
each R₅ is independently hydrogen, $C_{1-4}$alkyl or $C_{1-4}$alkoxy,
each R₆ is independently hydrogen, halo, $C_{1-4}$alkyl, $C_{1-4}$alkoxy, ($C_{1-4}$alkyl) carbonylamino or —NHCONH₂, and
t is 2 or 3,
wherein
each R₁ is independently hydrogen or $C_{1-4}$alkyl,
each R₇ is independently hydroxy, $C_{1-4}$alkoxy or —NH₂, each Z is independently

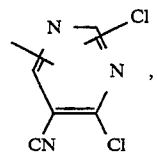

and
each An$^{\ominus}$ is independently a non-chromophoric anion,
with the proviso that Q₂ and Q₃ together contain a maximum of one —NR₁—Z group.

2. A compound according to claim 1, or a water-soluble salt thereof each cation of which is independently a non-chromophoric cation, or a mixture of such compounds or water-soluble salts,
wherein each halo is independently fluoro, chloro or bromo, the hydroxy group of each hydroxy alkyl or linear or branched hydroxy alkylene radical attached to a nitrogen atom is attached to a carbon atom that is not directly attached to the nitrogen atom, and
the —O— or —NR₁— radical of any interrupted linear or branched alkylene radical attached to a nitrogen atom is attached to a carbon atom that is not directly attached to the nitrogen atom.

3. A compound according to claim 2, or a water-soluble salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium, or a mixture of such compounds or water-soluble salts.

4. A compound according to claim 3, or a water-soluble salt thereof each cation of which is independently lithium, sodium, potassium or ammonium, or a mixture of such compounds or water-soluble salts.

5. A compound according to claim 4, or a water-soluble salt thereof each cation of which is sodium, or a mixture of such compounds or water-soluble salts.

6. A compound according to claim 2 having the formula

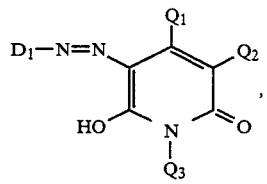

or a water-soluble salt thereof each cation of which is independently a non-chromophoric cation, or a mixture of such compounds or water-soluble salts.

7. A compound according to claim 6 having the formula

[Structure: D₁c—N=N—C(CH₃)=C(Q₂c)—C(=O)—N(Q₃a)—C(=O)... pyridone with HO]

or a water-soluble salt thereof each cation of which is independently a non-chromophoric cation, or a mixture of such compounds or water-soluble salts,
wherein
D₁c is

[Structure: Z—NR₁a—phenyl—CONH—phenyl—(SO₃H)ᵣ]

or

[Structure: Z—NR₁a—phenyl(SO₃H)—NHCO—phenyl]

Q₂c is hydrogen, —CONH₂ or —CH₂—SO₃H, and
Q₃a is hydrogen; —Y₁a—NR₁a—Z; methyl; ethyl; cyclohexyl; phenyl; phenyl monosubstituted by —NR₁a—Z; phenyl substituted by 1 or 2 substituents selected from chloro, methyl, methoxy, —SO₃H, —COOH and —NH₂; phenyl(C₁₋₂alkyl); phenyl(C₁₋₂alkyl) the phenyl ring of which is monosubstituted by —NR₁—Z; phenyl(C₁₋₂alkyl) the phenyl ring of which is substituted by 1 or 2 substituents selected from chloro, methyl, methoxy, —SO₃H, —COOH and —NH₂; or —W₁—Y₂a,
wherein
Y₁a is linear or branched C₂₋₄alkylene, linear or branched C₃₋₄alkylene monosubstituted by hydroxy

[Structures showing phenyl rings with (SO₃H)ₘ and W₂ substituents]

wherein
W₂ is linear or branched C₁₋₂alkylene, or
—Y₁a—NR₁a—Z is —W₃—N=N—Z,
wherein
W₃ is linear or branched C₂₋₃alkylene, and
Y₂a is —COOH, —SO₃H, —OSO₃H, hydroxy, cyano, methoxy, NR₁₁R₁₂ or —⊕NR₁₃R₁₄R₁₅ An⊖,
wherein
each R₁a is independently hydrogen, methyl or ethyl.

8. A compound according to claim 2 having the formula

[Structure: (SO₃H)ₜ-naphthyl—N=N—phenyl(R₅,R₆)—N=N—phenyl(R₅,R₆)—NR₁—Z]

or a water-soluble salt thereof each cation of which is independently a non-chromophoric cation, or a mixture of such compounds or water-soluble salts.

9. A compound according to claim 8 having the formula

[Structure: (SO₃H)ₜ-naphthyl—N=N—phenyl(R₅ₐ,R₆ᵦ)—N=N—phenyl(R₅ₐ,R₆ᵦ)—NR₁a—Z]

or a water-soluble salt thereof each cation of which is independently a non-chromophoric cation, or a mixture of such compounds or water-soluble salts,
wherein
R₁a is hydrogen, methyl or ethyl,
each R₅ₐ is independently hydrogen, methyl or methoxy, and
each R₆ᵦ is independently hydrogen, methyl, acetamido or —NHCONH₂,
with the provisos that (i) when t is 2, the —SO₃H groups are in the 1,5-, 3,6, 4,8-, 5,7- or 6,8-positions and (ii) when t is 3, the —SO₃H groups are in the 3,6,8- or 4,6,8-positions.

10. A compound according to claim 9, or a water-soluble salt thereof each cation of which is independently a non-chromophoric cation, or a mixture of such compounds or water-soluble salts, where in t i s 3.

11. A compound according to claim 10, or a water-soluble salt thereof each cation of which is independently a non-chromophoric cation, or a mixture of such compounds or water-soluble salts, wherein each R₅ₐ is independently hydrogen or methoxy.

12. A compound according to claim 11, or a water-soluble salt thereof each cation of which is independently a non-chromophoric cation, or a mixture of such compounds or water-soluble salts, wherein each R₅ₐ is hydrogen.

13. A compound according to claim 12 having the formula

[Structure: naphthyl with SO₃H groups—N=N—phenyl(CH₃)—N=N—phenyl—NR₁a—Z]

or a water-soluble salt thereof each cation of which is independently a non-chromophoric cation, or a mixture of such compounds or water-soluble salts, 14. A compound according to claim 13, or a water-soluble salt thereof each cation of which is independently a non-chromophoric cation, or a mixture of such compounds or water-soluble salts, wherein R₁a is hydrogen or methyl.

15. A compound according to claim 14, or a water-soluble salt thereof each Cation of which is independently a non-chromophoric cation, or a mixture of such compounds or water-soluble salts, wherein $R_{1a}$ is hydrogen.

16. A water-soluble sodium salt of a compound according to claim 15 having the formula

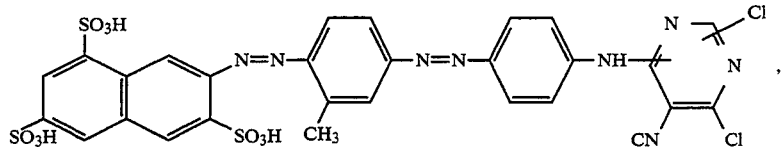

or a mixture thereof.

17. A water-soluble sodium salt of a compound according to claim 14 having the formula

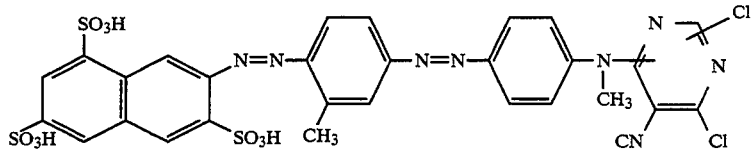

or a mixture thereof.

18. A process for dyeing or printing an hydroxy group- or nitrogen-containing organic substrate comprising applying to an hydroxy group- or nitrogen-containing organic substrate a compound, water-soluble salt or mixture according to claim 1, as dyeing or printing agent.

19. A process according to claim 18 wherein the substrate is a fiber material comprising natural or regenerated cellulose.

20. A process according to claim 19 wherein the substrate is a textile material comprising cotton.

* * * * *